United States Patent [19]

Music et al.

[11] Patent Number: 4,843,466

[45] Date of Patent: Jun. 27, 1989

[54] METHOD AND SYSTEM FOR DECOMPRESSING COLOR VIDEO SLOPE ENCODED DATA

[75] Inventors: John Music, Irvine; Gordon H. Smith, Santa Ana; James L. Thomas, Placentia, all of Calif.

[73] Assignee: Universal Video Communications Corp., Irvine, Calif.

[21] Appl. No.: 186,575

[22] Filed: Apr. 27, 1988

[51] Int. Cl.⁴ .................. H04N 11/02; H04N 11/04
[52] U.S. Cl. ................................ 358/133; 358/13; 358/85; 375/122
[58] Field of Search ............ 358/133, 134, 135, 136, 358/12, 13, 85; 375/122

[56] References Cited

U.S. PATENT DOCUMENTS

| | | | |
|---|---|---|---|
| 3,414,677 | 12/1968 | Quinlan | 358/133 |
| 3,609,244 | 9/1971 | Mounts | 375/122 |
| 4,058,835 | 11/1977 | Kennedy | 358/134 |
| 4,060,832 | 11/1977 | Devimeux et al. | 358/133 |
| 4,179,709 | 12/1979 | Workman | 358/133 |
| 4,210,927 | 7/1980 | Yumde et al. | 358/12 |
| 4,222,076 | 9/1980 | Knowlton | 358/133 |
| 4,261,018 | 4/1981 | Knowlton | 358/133 |
| 4,302,775 | 11/1981 | Widergren et al. | 358/136 |
| 4,306,249 | 12/1981 | Croll | 358/133 |
| 4,365,273 | 12/1982 | Yamada et al. | 358/133 |
| 4,394,774 | 7/1983 | Widergren et al. | 358/13 |
| 4,420,771 | 12/1983 | Pirsch | 358/133 |
| 4,455,571 | 6/1984 | Shimizu et al. | 358/138 |
| 4,468,708 | 8/1984 | Coleman, Jr. | 358/133 |
| 4,485,400 | 11/1984 | Lemelson et al. | 358/85 |
| 4,494,144 | 1/1985 | Brown | 358/133 |
| 4,541,012 | 9/1985 | Tescher | 358/133 |
| 4,546,383 | 10/1985 | Abramatic et al. | 358/85 |
| 4,589,110 | 5/1986 | Eng et al. | 358/133 |
| 4,605,963 | 8/1986 | Reitmeier et al. | 358/133 |
| 4,633,296 | 12/1986 | Cham et al. | 358/12 |
| 4,654,484 | 3/1987 | Reiffel et al. | 358/133 |
| 4,772,956 | 9/1988 | Roche | 358/133 |
| 4,774,587 | 9/1988 | Schmitt | 358/133 |

OTHER PUBLICATIONS

Gerken & Schiller, "A Low Bit-Rate Image Sequence Coder Combining a Progressive DPCM on Interleaved Raster with a Hybrid DCT Technique", IEEE Journal on Selected Areas in Communications, vol. SAC-5, No. 7, Aug. 1987.

Chen & Smith, "Adaptive Coding of Monochrome and Color Images", IEEE Transactions on Communication, vol. COM-25, No. 11, Nov. 19, 1977.

Kaneko, Hatori & Koike, "Improvements of Transform Coding Algorithm for Motion-Compensated Interframe Prediction Errors-DCT/SQ Coding," IEEE Journal on Selected Areas in Communications, vol. SAC-5, No. 7, Aug. 1987.

Kato, Mukawa & Okubo, "A Motion Picture Coding Algorithm Using Adaptive DCT Encoding Based on Coefficient Power Distribution Classification", vol. SAC-5, No. 7, Aug. 1987.

Primary Examiner—Howard W. Britton
Attorney, Agent, or Firm—Fulwider, Patton, Lee & Utecht

[57] ABSTRACT

The method and system of decompressing color video data for use in a video information communication system utilizes digitized run length and color information to represent the pixels in the scan lines of a video picture frame. The digitized signals are of a first digital word size, the run length portion of the digitized signal is of a second digital word size and the color portion of the digitized signal is of a third digital word size. The run length portion and the color portion are stored in an array in a memory to represent the pixels in the scan lines of the video picture frame. The memory consists of a pingpong A buffer memory and a pingpong B buffer memory, from which the run length and color information is transferred to a display drawing engine. The color portion of the digitized signal is converted into three digital color components of fourth, fifth, and sixth digital word sizes as a series of digitized signals representing individual pixels, which is then converted in a digital to analog converter to analog format for display on monitor.

65 Claims, 4 Drawing Sheets

X MARKS DECISION POINTS

RED, GREEN & BLUE COLORS AT APEX

RUN LENGTH

METHOD AND SYSTEM FOR DECOMPRESSING COLOR VIDEO SLOPE ENCODED DATA

BACKGROUND OF THE INVENTION

1. Field of the Invention

This invention relates generally to information signal processing, and in particular to a method and system of decompressing color video data in video information communication system. A more particular use of the invention relates to a method and system for decompressing color video data in a video telecommunication system in which data is sent and received over telephone lines.

2. Prior Art

Encoding of digital television signals ordinarily requires a transmission rate of approximately 200 Mbits/s. Recent developments in coding systems have permitted the transmission rate to be cut-to less than 2 Mbits/s. Coding systems using block oriented analysis of video picture frames and processing by a conventional hybrid discrete cosine transform (DCT) coefficient permit transmission at rates of between 64 Kbits/s and 384 Kbits/s. Such a system is described in Gerken and Schiller, "A Low Bit-Rate Image Sequence Coder Combining A Progressive DPCM On Interleaved Rasters With A Hybrid DCT Technique", IEEE Journal on Selected Areas in Communications, Vol. SAC-5, No. 7, August, 1987. Adaptive coding techniques applied to such DCT processing have allowed video data transmission at rates as low as one to two bits per pixel, as is described in Chen and Smith, "Adaptive Coding of Monochrome and Color Images", IEEE Transactions on Communications, Vol. COM-25, No. 11, Nov. 19, 1977. However, information transmitted at such low data rates seriously affects the ability to reconstruct a sufficient number of frames per second so that a real time picture is acceptable to a viewer. High capacity telephone lines are available which will carry transmissions at a rate of up to 1.544 Mbits/s but such lines are extremely expensive at a dedicated use rate, and are still quite expensive at a scheduled use rate. Lower capacity telephone lines are available which permit transmission at rates of up to 56 Kbits/s and 64 Kbits/s. Relatively expensive video digital and coding devices are commercially available which will transmit a video signal at 56,000 bits per second, so that it is necessary to utilize a combination of a device of this nature with the high capacity 1.544 Mbits/s telephone line to allow a framing speed much faster than about one frame per second. The current transmission rate limit of ordinary telephone lines approaches 18,000 bits per second, so that transmission of real time sequencing of video pictures over ordinary telephone lines has been viewed in the prior art as not being feasible.

Various schemes for reducing the amount of redundancy of information to be transmitted in a digital video signal have been used. One technique is to utilize a slow scan camera; and another technique is to transmit every nth scanning line for each frame. Another technique involves the sending of only those parts of a picture frame which are deemed to be important or to have changed in some significant manner, by dividing the picture frame into a number of segments or blocks which are typically 3×3 or 4×4 groups of pixels, and analyzing the content of the blocks. These techniques tend to also reduce the resolution of the video picture.

Another technique in the reduction of transmission time which does not decrease the resolution of a picture transmitted is run length encoding. In run length encoding, the scan lines of a picture frame are encoded as a value of the color content of a series of pixels and the length of the sequence of pixels having that value or range of values. The values may be a measure of the amplitude of a video signal, or other properties of such video signals, such as luminance or chrominance. An example of a system which utilizes run length coding of amplitude of video signals is U.S. Pat. No. 3,609,244 (Mounts). In that system, a frame memory also determines frame to frame differences, so that only those differences from one frame to the next are to be transmitted. Another example of a method for transmitting video signals as compressed run length values which also utilizes statistical coding of frequent values to reduce the number of bits required to represent data is U.S. Pat. No. 4,420,771 (Pirsch).

Ideally, compression of color video information to allow real time sequencing of picture frames at a rate of up to 15 frames per second, and at bit rates as low as 11,500 bits per second, would be desirable to allow the communication of color video data over ordinary telephone lines. A video data compression system able to achieve equivalent data transmission rates as systems using higher quality telephone lines with more efficient and less costly equipment than is currently available would also be desirable.

SUMMARY OF THE INVENTION

The present invention provides for a method and system of decompressing color video data in a video information communication system in which pixels in the scan lines of the video pictures are digitized into run length segments. The run length portion and color portion are stored in an array in a memory representing the pixels in the scan lines of the incoming video picture frames, sequentially; the color portion of the digitized signal is converted into three digital color components; and a color video signal in a display format is generated from the run length and color components by interpolation between a starting pixel and an ending pixel of the run length.

Briefly, and in general terms, the method of decompressing color video data, according to the invention is for use in a video information communication system utilizing digitized signals including run length and color portions representing pixels in scan lines of a video picture frame, with the digitized signals being of a first digital word size, the run length portion of the digitized signals being of a second digital word size, and the color portion of the digitized signal being of a third digital word size, and comprises the steps of storing the run length portion and the color portion in an array of run length and color component data in a memory, representing the pixels in the scan lines of the video picture frame; converting the color portion of the digitized signal into three digital color components of fourth, fifth, and sixth digital word sizes, respectively; and generating a color video display signal from the run lengths of converted color components by interpolating a smooth color transition between run length starting and ending pixels.

Also according to the invention, briefly and generally, the system for decompressing color video data in a video information communication system which utilizes digitized signals representing run length and color information from the pixels of scan lines of a video picture frame, with the digitized signals being of a first digital word size, the run length portion being of a second digital word size, and the color portion being of a third digital word size, comprises means for storing the run length portion and the color portion in an array of run length and color data in a memory, representing the pixels in the scan lines of a video picture frame; means for converting the color portion into three digital color components of fourth, fifth and sixth digital word sizes, respectively; and means for generating a color video display signal from the run lengths of converted color components by interpolation of a smooth color transition between run length starting and ending pixels. The invention further generally comprises a monitor for use in video information communication system, including the system for decompressing color video slope encoded data.

In a preferred embodiment the color portion of the digitized signal is converted into three digital color components each having a word size of six bits. In a most preferred embodiment the run length and associated color portions are alternately stored in a first buffer memory until a picture frame in that buffer memory is complete; then that frame is converted to standard NTSC format and displayed while the system is sequentially storing the run length and associated color components of a next picture frame to a second buffer memory, until the picture frame in the second buffer memory is complete, at which time the display switches to the information in the second buffer. The storing to the first and second buffer memories is repeated for subsequent picture frames. In the case in which the run length portion of the digitized signal has been concatenated, the method and system of the invention also involve the division of the concatentated run lengths and color component combinations into smaller, unconcatenated run length and digital color component combinations, before storing of the run length and color component information occurs. The display system further converts the discrete color information for each frame to transitioning colors that change in a uniform or shaped rate from one discrete color to the next. This process eliminates the color contouring which would occur if only the discrete colors as received were used.

Other aspects and advantages of the invention will become apparent from the following detailed description, and the accompanying drawings, illustrating by way of example the features of the invention.

DETAILED DESCRIPTION OF THE INVENTION

As is shown in the drawings for purposes of illustration, the invention is embodied in a method and system for decompressing color video data in a video information communication system utilizing a plurality of digitized signals representing run length and color of the pixels in the scan lines of video picture frames. The run length and digital color signals are stored in an array in a memory representing the pixels in the scan lines of the video picture frame, the color portion of the digitized signals is converted to three digital color components of appropriate digital word sizes to represent individual points in a picture, and the converted color components are used generate a color video display signal by interpolation for a smooth color transition between starting and ending pixels.

In accordance with the invention, there is provided a method of decompressing color video data in a video information communication system utilizing a plurality of digitized signals having a portion thereof representing run length and a portion of representing color of at least a portion of a plurality of pixels in a plurality of scan lines of a video picture frame, said digitized signals being of a first digital word size, said run length portion of said digitized signal being of a second digital word size, said color portion of said digitized signal being of a third digital word size, comprising the steps of storing said run length portion and said color portion in an array in a memory means of run length data and color component data representing said plurality of pixels in said plurality of scan lines in said video picture frame; converting said color portion of said digitized signal into three digital color component signals of fourth, fifth, and sixth digital word sizes, respectively; and generating from at least a portion of said run length and associated color components for the scan lines of said picture frame a pixel by pixel representation of the picture by mapping a starting pixel for a run length according to the associated color components, and mapping the remaining pixels in said run length by interpolating a smooth color transition to an ending pixel of said run length, for each said scan line to be mapped.

The invention further provides for a system for decompressing color video slope encoded data in a video information communication system utilizing a plurality of digitized signals having a portion thereof representing run length and a portion representing color of at least a portion of a plurality of pixels in a plurality of scan lines of a video picture frame, said digitized signals being of a first digital word size, said run length portion of said digitized signal being of a second digital word size, and said color portion of said digitized signal being of a third digital word size, said system comprising means for storing said run length portion and said three digital color component signals in an array in a memory means of run length data and color component data representing said plurality of pixels in said plurality of scan lines in said video picture frame means for converting said color portion of said digitized signal into three digital color component signals of fourth, fifth, and sixth digital word sizes, respectively; and means for generating a color video display signal from at least a portion of said run length and associated color components for the scan lines of said picture frame each pixel of said picture frame, by mapping a starting pixel for a run length according to the associated color component, and mapping the remaining pixels in said run length by interpolating a smooth color transition to an ending pixel of said run length, for each said scan line to be mapped. The invention further provides for a monitor which includes the system for decompressing color video slope encoded data.

The invention additionally provides for a system for compressing and decompressing color video data in a video communication system having means for producing a color video signal for a plurality of video picture frames, with each picture frame comprising a plurality of scan lines composed of a plurality of pixels, and each scan line having a starting pixel and an ending pixel, with each pixel comprising three digital color component signals, including means for determining a luminance function for each pixel, means for determining run lengths of pixels in a scan line of said digital color component signals, and means for coding at least a portion of said plurality of pixels in each scan line as a plurality of combinations of run lengths and color component signals, said decompressing of color video data utilizing a plurality of digitized signals having a portion thereof representing run lengths and a portion thereof representing color of at least a portion of said plurality of pixels in said plurality of scan lines, said digitized signals being of a first digital word size, said run length portion of said digitized signal being of a second digital word size, and said color portion of said digitized signal being of a third digital word size, said system for compressing and decompressing color video data comprising means for storing said run length portion and said color portion in an array in a memory means of run length data and color component data representing said plurality of pixels in said plurality of scan lines in said video picture frame; means for converting said color portion of said digitized signal into three digital color component signals of fourth, fifth, and sixth digital word sizes, respectively; and means for generating a color video display signal from at least a portion of said run length and associated color components for the scan lines of said picture frame for each pixel of said picture frame, by mapping a starting pixel for a run length according to the associated color component, and mapping the remaining pixels in said run length by interpolating a smooth color transition to an ending pixel of the said run length, for each said scan line to be mapped.

Further provided by the invention is a monitor for use in a video communications system having means for producing a color video signal for a plurality of video picture frames, with each picture frame comprising a plurality of scan lines composed of a plurality of pixels, each scan line having a starting pixel and ending pixel, with each pixel in said frame comprising three digital color component signals; means for determining a luminance function for each pixel; means for determining a run length of pixels for a combination of said three digital color components; and means for coding said combination of run lengths and color component signals for each said run length; said monitor utilizing a plural- and said color portion in an array in a memory means of run length data and color component data representing said plurality of pixels in said plurality of scan lines in said video picture frame; means for converting said color portion of said digitized signal into three digital color component signals of fourth, fifth, and sixth digital word sizes, respectively; and means for generating a color video signal for display from at least a portion of said run length and associated color components for the scan lines of said picture frame for each pixel of said picture frame, by mapping a starting pixel for a run length according to the associated color component, and mapping the remaining pixels in said run length by interpolating a smooth color transition to an ending pixel of said run length, for each said scan line to be mapped.

Figure 1:
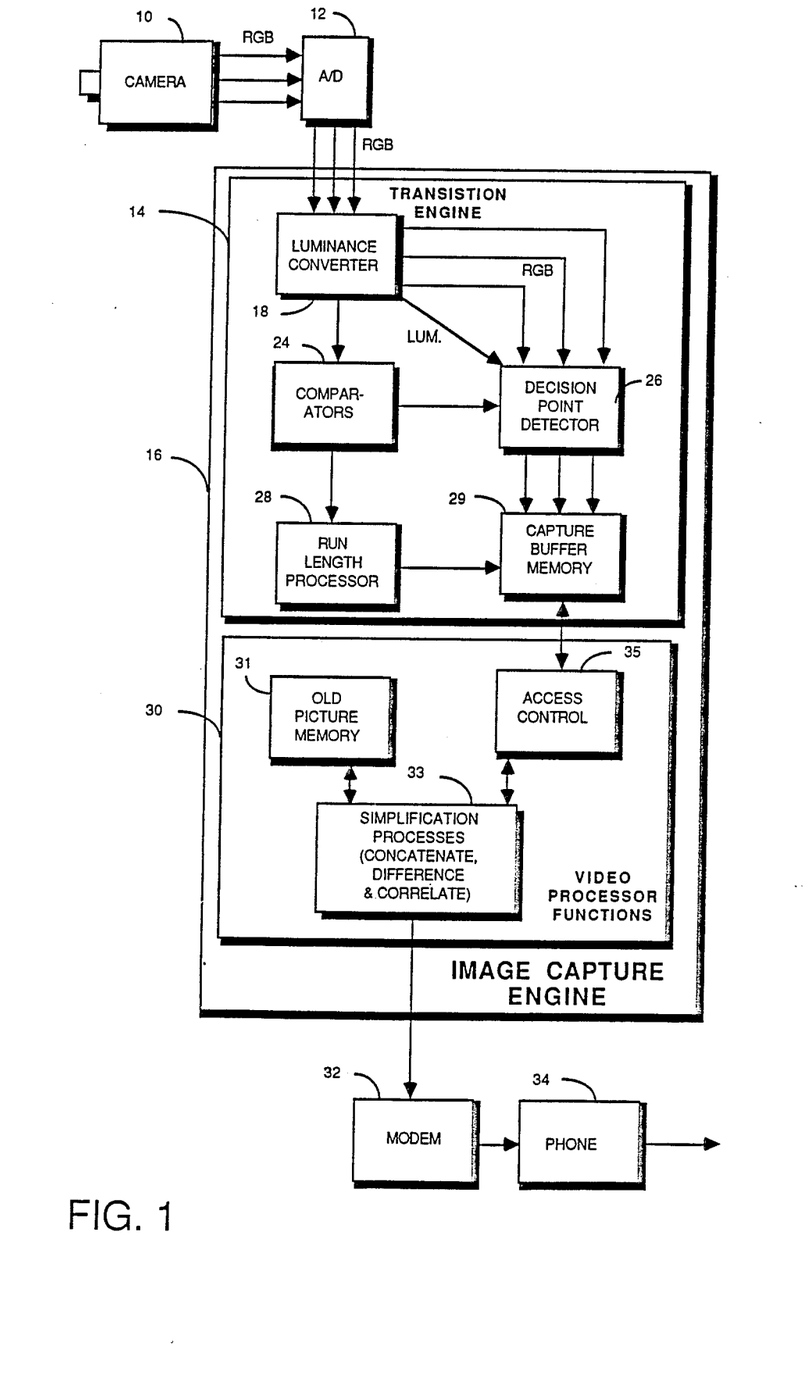
FIG. 1 is a schematic diagram of the system and method for compressing color video data in a video communication system.

As is illustrated in the drawings, in a preferred implementation of the invention, the video communication system is capable or producing a color video picture using an RGB video camera, generating an analog RGB signal at the normal 60 fields per second, with each field representing half of the picture in an interlaced mode. Other systems using other frame rates may be used. The signal for the video picture frames generated by the camera 10 is received by an analog to digital converter 12, which converts the green and blue (RGB) analog components into digital RGB components, which are each digitized as six bit digital words, forming packets of bits for the RGB components for each pixel of the color video picture of eighteen bits.

The type of the device used to generate the source color video picture is not crucial to the invention, as a camera generating a standard NTSC composite signal which is converted to an RGB digital output would also be suitable as would a field rate differing from 60 fields/sec. The output of the camera also does not need to be strictly RGB, since other three color component groups may be used to create and transmit color video pictures. For example, the three digital color component signals may be cyan, magenta, and yellow; hue, saturation, and intensity or even two distinct colors and a third parameter based upon the entire video signal, such as hue, saturation or intensity of an original analog video signal, so that there would be some automatic weighting of the color information generated by the camera.

It is also not essential that the three color components be represented by the same number of bits, since it is known in the television industry that certain ranges of colors are not as easily perceived by the human eye. Such a weighting of information could involve a reduction in the number of bits used for the red component in an RGB scheme, for example, thus permitting transmission of more gradations of other color information that is actually perceptible.

In addition, the source of the color video pictures to be compressed may be a storage means, such as a video disk, a computer file storage media, a video tape, or the like from which the color video information can be picture element, or pixel, of each scan line in the sequence of video picture frames generated by the analog front end of the system. In the preferred mode, the luminance converter 18 sums the bits from each of the three digital color components for each pixel in the scan lines of the video picture frame to get a luminance (or intensity) value and performs further processing of the data obtained. In the system of the present invention each scan line preferably contains 480 pixels, which matches the resolution of the camera and which provides for better resolution than is typically available in the prior art, in which generally only 256 pixels are utilized per scan line. The luminance of the three color components may be weighted to give greater significance to one color or two colors to provide the luminance function, and may also be based in part upon an original source analog video signal. However, the luminance function is preferably based in part at least upon the sum of the three digital color components. The luminance function derived from the sum of the three six bits color components therefore has a digital word size of eight bits. This luminance function for each pixel is utilized in the input capture engine for evaluating one or more decision parameters based upon the luminance function for determination of those pixels which operate as decision points about which the one or more of the decision parameters are found to vary from a prestored set of threshold values.

The luminance function is an excellent indicator of color changes in the picture, or movements of objects in the picture. In the input capture engine the one or more decision parameters based upon the luminance function may also be used as the basis for determination of differences from line to line, and of distinctive sequences of pixels which define edges of objects which can be determined to be moving from frame to frame. Generally, the luminance, or other combination of color components which comprise the luminance function, undergoes significant changes where there are changes in the characteristics of the picture.

The camera also introduces anomalies or artifacts into the video picture due to noise in the color sampling resolution which ideally should be eliminated to reduce the amount of data to be transmitted since they contribute nothing beneficial to the picture. When the picture is displayed with a new field every 60th of a second, the effect of such anomalies is averaged out by the human eye. Areas having a smooth appearance and little actual detail upon close observation seem to "crawl". This appearance is also known as the "mosquito effect". When a picture is frozen so that only one field or picture frame is being examined, the picture takes on a grainy, speckled appearance. The impact of the noise on the luminance data is in the form of tiny variations in the computed luminance. When the picture is digitized, the digitizing process also converts all of these artifacts to digital representations, even though they do not actually represent picture detail. The processing of luminance in the input capture engine operates to eliminate such meaningless details.

One preferred method eliminating the non-essential details caused by noise in the luminance data is to determine the points of change based at least in part on the luminance function for pixels in the scan lines by comparing differences in one or more decision parameters with corresponding adaptive thresholds. This is termed feature encoding. The decision parameters are preferably comprised of differences of the luminance function between pixels, determined between proximate pixels (Diff-1) in a scan line, n plus one n plus two, or even a further distance away, where n represents the position on a scan line of the pixel being examined for changes in luminance; between adjacent first differences (Diff-2), and a cumulative parameter (Cum-diff) which is a sum of the individual difference functions Diff-1, Diff-2, and so on. Each decision parameter has its own corresponding adaptive threshold, having a default value which is subject to modification by this system in response to operator settings. The adaptive threshold preferably has a default value which may be adjusted by the input capture engine responsive to operator or processor selections for resolution. The selecting of the threshold parameters for determining either the feature or transition decision points is quite subjective. The selection of the parameters determines the number of data points required to define the picture and it also determines the overall perceptual quality of the picture.

Typically for the feature run length determination, two thresholds are used. One is the cumulative change in luminance since the last decision point, Cumdiff. Cumdiff will trigger a decision point if it was greater than 6 and the number of pixels since the last decision point was greater than 5. Another decision parameter is the sum of two adjacent difference values, Diff2 (this is the same as the difference between luminance values that are two pixels apart). If the Diff2 value is computed to be greater than typically 32, the logic wil signify that the line is entering an edge, which identifies a decision point, and will stay in the edge characteristic untie the Diff2 value falls below 20. When the edge mode is exited, the color of the next pixel is carried all the way back to the pixel where the starting edge determination was made. Also, if Diff2 changes sign, it signifies a new decision point. Changing the values for the cumdiff thresholds greatly affects the quality and data complexity of the picture.

In the slope determination of decision points (apexes), three general conditions are used. An initial slope is determined at the decision point and all measurements are base on that slope. The initial slope, INITS, is determined by computing the following function termed NDIFF2:

$$NDIFF2 = (luminance_{(i+2)} - luminance_{(i)})/2$$

INITS is the value of NDIFF2 immediately after the decision point.

CUMDIFF in the slope case is defined the following way:

$$CUMDIFF_{(i)} = CUMDIFF_{(i-1)} + NDIFF2_{(i)}$$

If the absolute value of the CUMDIFF is typically greater than 20 and the number of pixels in the run length is typically greater than 10, then a decision point will be triggered. Similarly, if the absolute value of NDIFF2 is less than or equal to typically 4 and the run length is typically greater than 5, a decision point will be triggered unless the last decision point was also triggered in this manner. The third decision parameter is also based upon NDIFF2:

$$TRIGVAL_{(i)} = NDIFF2_{(i)} - INITS$$

The threshold for TRIGVAL is usually set in the range of 4 to 10 and will trigger a decision point any time the absolute value reaches or exceeds the set value and the run length is at least 2 pixels. Other techniques may be used but these seem to give good quality pictures with an acceptable number of data points.

Figure 2:
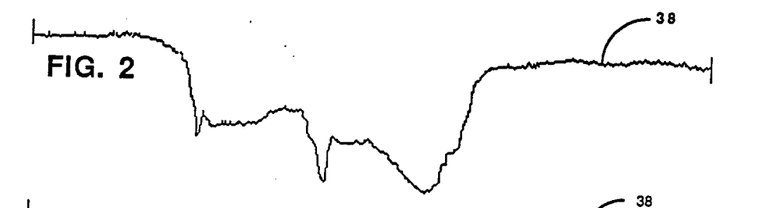
FIG. 2 is a luminance plot across one scan line in a video picture.
Figures 3, 4:
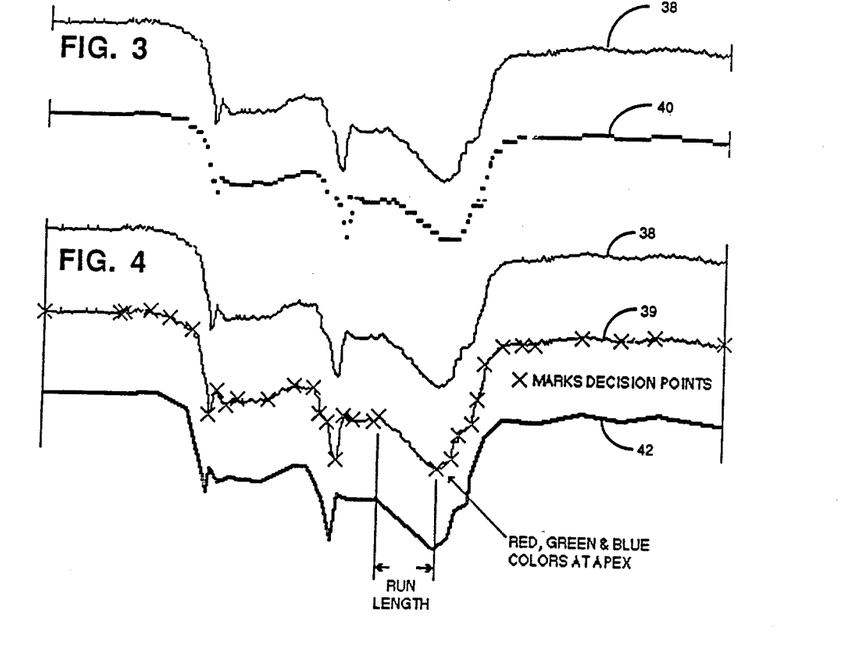
FIG. 3 shows a run length representation of features in a video scan line.
FIG. 4 shows is a run length representation of transitions about slope decision points of a video scan line.

A graphic representation of a typical plot of luminance across a line of a video picture is shown in FIG. 2. The luminance function of the pixels intersected by the scan line 36 is graphically represented by line 38. As is shown in FIG. 3, a graph of the decision points based upon comparison one of the decision parameters with the corresponding adaptive difference threshold in a feature encoding technique, results in stepped line 40, a sequence of horizontal straight lines across the luminance pattern. Each horizontal line represents a separate length of a specific color.

Figure 5:
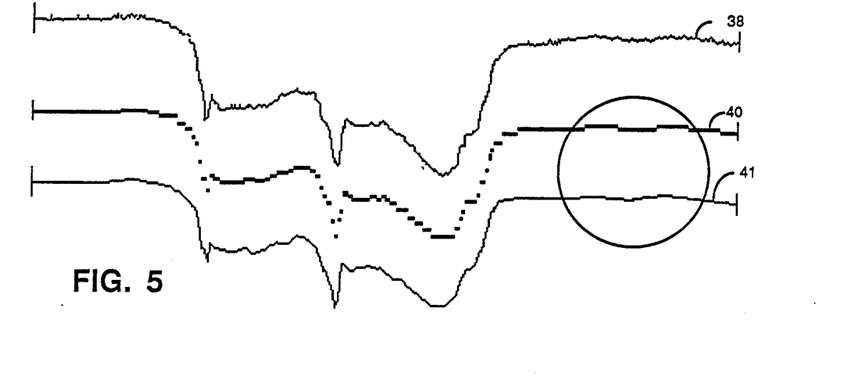
FIG. 5 shows a representation of the reconstructed video scan line for display.
Figure 6:
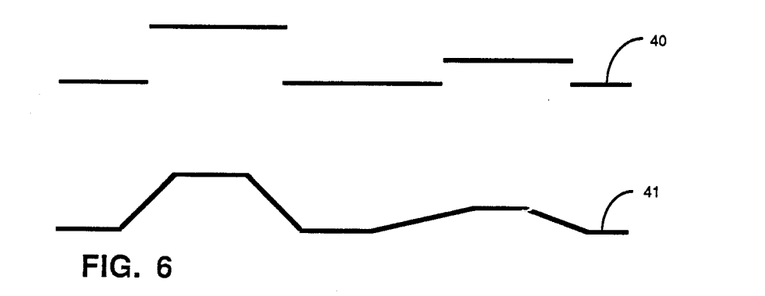
FIG. 6 shows a representation of how the run length data is converted to display data with transitions between runs.

A second approach which may be used to eliminate the non-essential details is a transition or slope encoding technique, which is the preferred technique of the present invention, and which is illustrated in FIG. 4. In this technique the rate of change of the differences in the decision parameter between pixels is determined, and the rates of change of these differences are compared with an adaptive, prestored difference rate of change threshold to determine decision points or apex points. These change points or decision points are indicated as X's on lines 39. They indicate the location of the next apex. "Run length" is defined as being the pixel distance between decision points, for both the feature encoding and slope encoding techniques. According to the transition or slope encoding technique, the luminance data results in a line 42 representing a series of apexes or slope decision points, which may be used for controlling the color segments between decision points. A drawing engine can produce a smooth transition of color values for the run length between decision points when the encoded information is to be retrieved. In this technique, for each scan line an initial color is transmitted, followed by as many sequences of run length and color values as are necessary to represent the picture frame content. In either implementation the information is displayed as a series of slopes. For the run length encoded data artificial color slopes are inserted into the display line as shown in FIG. 5. In this case the slopes are generated as a function of the luminance shift between runs and the length of the adjoining runs as shown in FIG. 6.

In the image capture engine of FIG. 1, the decision point detector 26 for determining decision points may alternatively be able to utilize either one of these methods for fixing the decision points in the color of the pixels in the picture, as each method has its respective advantages and disadvantages. The feature coding technique is typically more appropriate for pictures with a complexity of objects with distinctive edges or lines. On the other hand, the slope encoding technique is most suitable for encoding gradual transitions in shading or gradual color changes, but may require additional coding to represent complex pictures with images having many edges and lines. In the preferred implementation of the slope encoding technique, a sequence of thresholds will be compared with decision parameters, and the cumulative parameter (cum-diff) and an adaptive cumulative threshold will also be utilized in determining decision points, to account for those slow, gradual rates of change of luminance which would still result in an accumulated luminance change which is significant enough to merit identification of a decision point.

The three component color codes are also operated on in the run length processor 28 to drop the two least significant bits from the six bit values for the color components, reducing each of the color components in the preferred mode to four bit digital words. Alternatively, the transition engine may also contain a predetermined color map representation of three-component colors, with an n-bit code corresponding to a particular color combination. Here, the colors of the image are matched as closely as possible with the colors in the color map. As a further alternative, the color codes could also be rounded. These truncated or reduced digital color components are then encoded with the run lengths between decision points in the run length processor 28. Although the preferred bit size for the reduced color components is four bits, just as the input digital word size for the color components from the analog front end can be of different sizes to vary the informational content, the reduced digital color components may also be of different sizes. A particular combination of digital word sizes for color components may include a reduced size for the red component, due to the recognition in the industry of the reduced perceptibility of this component.

This slope encoding technique allows for a variable number of bits to be used to represent an initial picture frame and then changes in subsequent picture frames, in order to encode the minimum number of bits for each picture frame. This is significant a improvement over the prior art which typically analyzes a four by four or three by three block of pixels to compress the information in such a block, which always results in the same number of bits being utilized to represent the informational content in the picture, whether there have been changes outside the segment or not.

The second major portion of the image capture engine is the capture buffer memory (CBM) 29, which receives the encoded run lengths and reduced color components representing some 200 lines of data from the picture frame. Alternatively, if the data rate required becomes too high to send pictures at a desired speed, lesser numbers of scan lines can be stored, such as 150 or 100 lines. The run length and color component information in the capture buffer memory is then transmitted to the video data processor 30, which accesses the run length and color data in the capture buffer memory by an access control 35, and operates as an interface to transform and transmit the video information in a format suitable for transmission by the modem 32, connected to the telephone 34, and which may include means for further compressing the video data, at 33. The video data may also be compared with a previous picture frame stored in an old picture memory 31.

It is possible in a simplification processor 33 of a video data processor 30 to further analyze the difference between color values of pixels after the color codes have been truncated to provide the reduced color component codes, and to concatenate run lengths of such reduced color component codes which vary less than a given threshold value, or to further concatenate run lengths of the reduced color codes based upon variance of one or more of the decision parameters with respect to a corresponding threshold. As the run length code is typically at a maximum of four bits to be compatible with run length and color code combinations of 16 bits, with 16 bit computer buses in the current implementation, concatenation of a sequence of pixels for each run length would be expected to permit coding of up to sixteen pixels per run length. However, in the current implementation the values 0 to 15 are used to represent run lengths of from 2 to 17 pixels, since run lengths of 0 and 1 are not meaningful. Alternatively, longer run lengths may be determined initially as well, as may be compatible with different capacity computer buses, to permit run lengths of greater than 4 bits and run length color code combinations greater than 16 bits.

As mentioned previously, it is expected that the limits of compression required for adequate smoothing of information in a real time sequencing of video pictures in telecommunication would be about 15 frames per second for transmission over conventional telephone lines. It would be possible to use a modem at 1200 bps (bits per second), but this would considerably slow the number of frames per second possible in the communication system. Ideally, the system is configured for half duplex mode, and a full duplex mode of configuration would be expected to require two telephone lines. Ideally the modem that is to be used is one which would utilize the largest bandwidth possible, and may be conventional 2400 bps or 9600 bps modem or special modems providing higher bit rates may be used.

Although the invention has been described in the context of a video telephone conferencing system, the invention may be also be adapted for use in compressing color video data on magnetic media, such as magnetic floppy discs which may be used in storing and communicating such data via computer systems, magnetic hard disks for image storage or short video movie sequences, or on video discs for video disc players which could transmit the information in the form of a full length movie.

Figure 7:
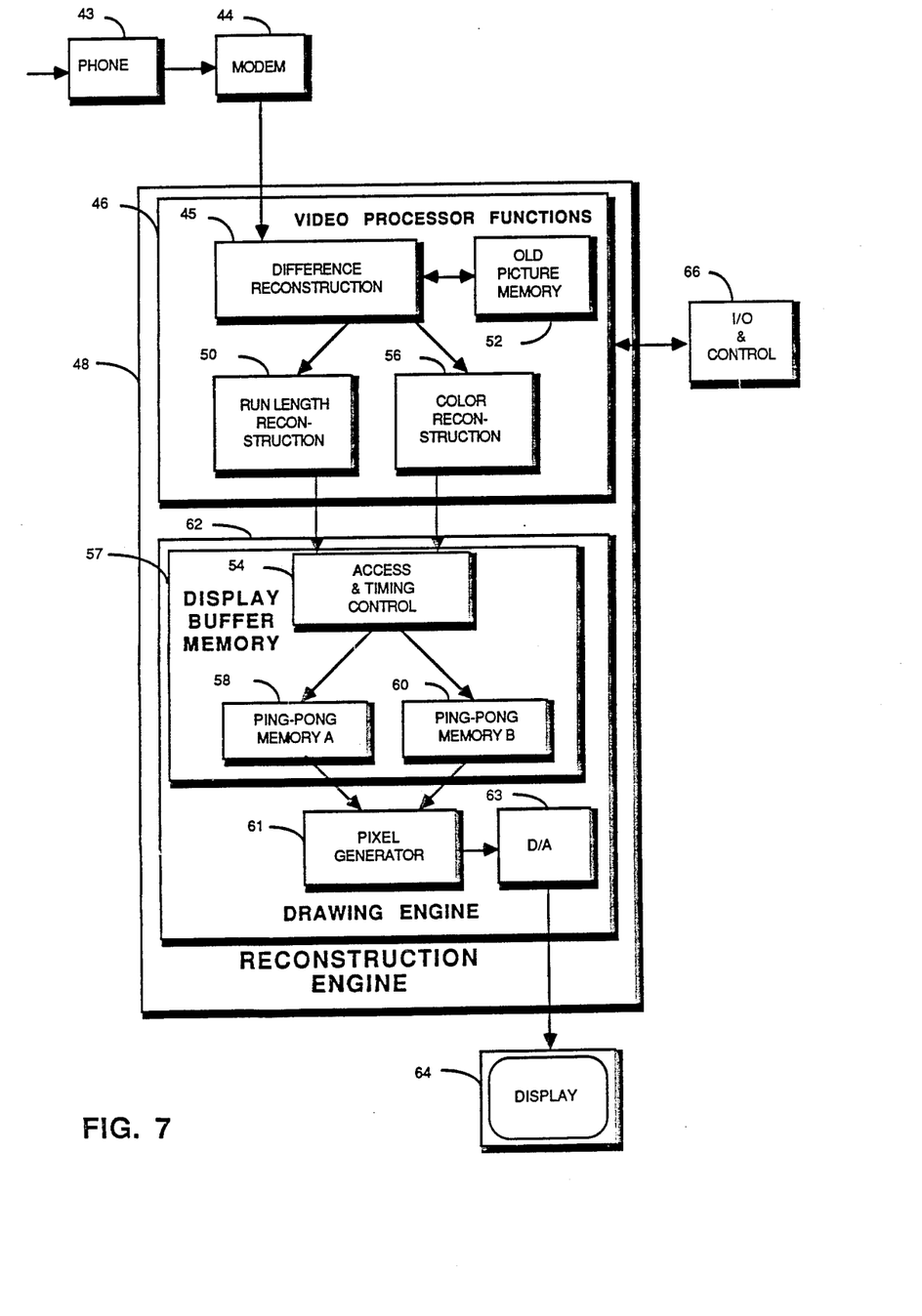
FIG. 7 is a schematic diagram of the method and system for decompressing color video slope encoded data.

With reference to FIG. 7, in the preferred embodiment, a telephone 43 receives a transmitted signal from a transmitter modem over ordinary telephone lines and the receiver modem 44 converts these signals to an electronically digitized format to be receivable by video data processor 46. The video data processor then adapts the digitized signals which represent encoded run length and color information to a format which is acceptable for reception by the drawing engine 62. The drawing engine of the reconstruction engine 48 converts the run length data to slope form and presents it pixel by pixel to the digital to analog converter for use by the monitor. Alternatively, the video processor interface could be adapted to receive the compressed color video data from a computer system 66 retrieving the information from magnetic media, such as a hard disc or high capacity floppy discs, or from a video disc player for displaying a much greater length series of video picture frames, in a form such as for a video movie. The video data processor preferably includes microprocessor means and associated memory means (not shown) programmed to carry out various functions. A preferred function is to reconstruct a total picture frame data representation in terms of run length and color codes from an old picture memory 52 of the last picture frame data, and an array of the run lengths and color codes which have changed from the last picture frame. This difference reconstruction function 45 prepares picture frame data for run length reconstruction at 50 and color code reconstruction 56, utilizing control signals embedded in the run length and color data.

As the run length and color information are received by the video data processor 46 of the reconstruction engine 48, the digitized signals are typically of a digital word size of sixteen bits. The number may vary, depending upon the type of statistical encoding used. Alternatively a color code (which may be from 4 to 8 bits in length) may be used to select specific colors from a map or pallet so that fewer bits need to be sent. As compressed and encoded from an input construction engine as described earlier, the digital word size of the run length portion actually processed would typically be four bits, and the digital word size of the color code portion would be twelve bits. As mentioned previously, the preferred apportioning of bit sizes of the three color component codes is such that each digital color code component is of a digital word size of four bits. However, only small portions of the picture which have actually changed may be actually encoded, with appropriate control data for skipping run lengths which may not have changed being embedded in the transmitted information. The run length reconstruction or decoder function 50 of the video data processor operates to separate the run length portion from the digitized signal, and the color code reconstruction function 56 of the video data processor, for decoding the color codes, can separate the digital color components from the incoming digitized signals. However, advanced signal processing and compression of the data may also involve the concatenation of run lengths to a digital word size of eight or nine bits, so that the run length decoder function would then also operate to separate the eight or nine bit digital word size into four bit digital word portions. In the event that the run length codes were concatenated to an eight or nine bit digital word size, the color code portion would have also have been subjected to advanced data compression techniques to reduce the three digital color codes each of four bits to a combined color code portion having a digital word size of eight bits. The color reconstruction function 56 would then also operate to convert the eight bit digital color codes to three digital color codes of the four bit digital word size.

From the reconstruction engine run length decoder and color codes sections the run length and color code information is transferred from the video data processor via the access and timing control circuitry 54 in the drawing engine 62 to a drawing engine display buffer memory 57 which ideally comprises dual memory buffers, pingpong A 58 and pingpong B 60. The access and timing control 54, under the direction of the video processor, sends the reconstructed run length and color information for storing in one of the ping pong buffer memory portions until the information for an individual picture frame is complete; that picture is then displayed while the next sequential picture information received by the system is sent and stored in a similar fashion in the second portion of the display buffer memory. Each block of the display buffer memory needs to be of a sufficient capacity to avoid overflow of the memory by the run length and color code information, and it has been found that a random access memory of a capacity of 32K 16 bit digital words is adequate for the picture reconstruction.

The drawing engine 62 includes a pixel generator 61 for converting the run length and color codes stored in the individual pingpong memories to individual points for display on a monitor 64. The access and timing control 54 of the drawing engine is responsible for all display timing and control for the pixel generator. The drawing engine generates a write strobe to write the runs of color information to the series of points to be converted from digital to analog for display.

The pixel generator of the drawing engine includes all the necessary functional sections to implement the linear interpolation between pairs of points designated by the run lengths, and preferably converts the four bit color components to either six or eight bit digital words, for six or eight bit precision, in three separate channels, with one for each of the RGB components. Increasing the bit size allows the pixel generator to generate smoother gradations of color transitions between pixels of different colors. For example, although four bit digital word sizes permit up to 4,096 color combinations of red, green and blue components, only up to 16 gradations of any one of the color components would be possible. Increasing the bit size up to 6 allows for up to 64 gradations of any individual component, and up to 262,144 total combinations. An eight bit digital word size permits an even greater range of gradations for an individual component. However, as discussed previously, the full digital word sizes for the color components need not be equal, and may be in fact arranged so as to allow a broader range of colors for one or two of the color components, at the expense of one of the color components which would only require a smaller digital word size to accommodate its perceptibility. The pixel generator therefore dynamically generates a complete digital representation of the pixels of a picture frame to be displayed on a pixel-by- pixel basis, and this information is transmitted on RGB three channels from the pixel generator to the digital to analog converter 63 which converts the video signal to analog form for displaying on the monitor 64.

It is significant in the method and system for decompressing color video slope enclosed data that the mapping of the video picture information is accomplished while the color code information is in a digitally compressed form, so that picture information may be rapidly filled into one pingpong buffer memory in the display buffer memory, from which a complete pixel by pixel representation is formed by the display drawing engine, until a new complete set of picture information is received in the other pingpong buffer memory. It is also significant that the display drawing engine interpolates a smooth color transition for each run length, allowing for maximum coding of a large amount of complex picture information.

Although one specific embodiment of the invention has been described and illustrated, it is clear that it is susceptible to numerous modifications and embodiments within the ability of those skilled in the art and without the exercise of the inventive facility. Thus, it should be understood that various changes in form, detail and application of the present invention may be made without departing from the spirit and scope of this invention.

I claim:

1. A method of decompressing color video data in a video information communication system utilizing a plurality of digitized signals having a portion representing run length and a portion representing color of at least a portion of a plurality of scan lines of a video picture frame, said digitized signals being of a first digital word size, said run length portion of said digitized signal being of a second digital word size, and said color portion of said digitized signal being of a third digital word size, comprising:
   (a) storing said run length portion and said color portion in an array in a memory means of run length data and color component data representing said plurality of pixels in said plurality of scan lines in said video picture frames;
   (b) converting said color portion of said digitized signal into three digital color component signals of fourth, fifth and sixth digital word sizes, respectively; and
   (c) generating a color video display signal from said run length and associated color components for the scan lines of said picture frame for each pixel of said picture frame, by mapping a starting pixel for a run length according to the associated color components, and mapping the remaining pixels in said run length by interpolating a smooth color transition to an ending pixel of said run length, for each said scan line to be mapped.

2. The method of claim 1, wherein said fourth, fifth, and sixth digital word sizes are equal.

3. The method of claim 1, wherein at least two of said fourth, fifth, and sixth digital word sizes are equal.

4. The method of claim 1, wherein each of said fourth, fifth and sixth digital word sizes are different.

5. The method of claim 1, wherein said three digital color component signals represent red, green, and blue color video components of an RGB video signal.

6. The method of claim 1, wherein said digital color component signals represent cyan, magenta, and yellow color video components.

7. The method of claim 1, wherein said three digital color components signals represent first and second colors and a parameter selected from the group consisting of hue, saturation, and intensity, based upon luminance of a source video signal.

8. The method of claim 1, wherein said three digital color components are based upon hue, saturation, and intensity.

9. The method of claim 1, wherein the digital word size of each of said three digital color components is six bits.

10. The method of claim 1, further including the step of dividing said run length and color component combinations into a plurality of unconcatenated run length and digital color component combinations having a run length portion of a seventh digital word size smaller than said second digital word size, for each run length and color component combination having a run length value greater than said seventh digital word size.

11. The method of claim 1, further including the step of receiving skip codes representing run length and color component data in the scan lines to be skipped over in the storing of said run length and associated color components of said scan lines of said picture frame in said memory means, whereby only said run length color component information which has changed in said picture frame is stored in said memory means.

12. The method of claim 1, wherein said step of storing said run length and associate color components in a memory means comprises alternately storing said run length and color components data in a first buffer memory until first set of said data is complete, and sequentially storing said run length and associated color components of a next set of picture data to a second buffer memory until said data for said next set of picture data is complete, and repeating said steps of storing in said first and second buffer memories for subsequent picture data sets.

13. The method of claim 10, further comprising sequentially presenting picture frame data to a pixel generator from said first memory buffer and said second memory buffer as each picture frame data in each said memory buffer is completed.

14. A system for decompressing color video data in a video communication information system utilizing a plurality of digitized signals having a portion thereof representing run length and a portion of representing color of at least a portion of a plurality of scan lines of a video picture frame, said digitized signals being of a first digital word size, said run length portion of said digitized signal being of a second digital word size, and said color portion of said digitized signal being of a third digital word size, said system comprising:
(a) means for storing said run length portion and said color portion in an array in memory means of run length data and color component data representing said plurality of pixels in said plurality of scan lines in said video picture frame;
(b) means for converting said color portion of said digitized signal into three digital color component signals of fourth, fifth and sixth digital word sizes respectively; and
(c) means for generating a color video display signal from said run length and associated color components for the scan lines of said picture frame for each pixel of said picture frame, by mapping a starting pixel for a run length according to the associated color component, and mapping the remaining pixels in said run length by interpolating a smooth color transition to an ending pixel of said run length, for each said scan line to be mapped.

15. The system of claim 14, wherein said fourth, fifth, and sixth digital word sizes are equal.

16. The system of claim 14, wherein at least two of said fourth, fifth, and sixth digital word sizes are equal.

17. The system of claim 14, wherein each of said fourth, fifth, and sixth digital word sizes are different.

18. The system of claim 14, wherein said three digital color component signals represent red, green, and blue color video components of an RGB video signal.

19. The system of claim 14, wherein said digital color component signals represent cyan, magenta, and yellow color video components.

20. The system of claim 14, wherein said three digital color component signals represent first and second colors and a parameter selected from the group consisting of hue, saturation, and intensity, based upon luminance of a source video signal.

21. The system of claim 14, wherein said three digital color components are based upon hue, saturation, and intensity.

22. The system of claim 14, wherein the digital word size of each of said three digital color components is six bits.

23. The system of claim 14, further including means for dividing said run length and color component combinations into a plurality of unconcatenated run length and digital color component combinations having a run length portion of a seventh digital word size smaller than said second digital word size, for each run length and color component combination having a run length value greater than said seventh digital word size.

24. The system of claim 14, further including means for receiving skip codes representing run length and color component data in the scan lines to be skipped over in the storing of said run length and associated color components of said scan lines of said picture frame in said memory means, whereby only said run length color component information which has changed in said picture frame is stored in said memory means.

25. The system of claim 14, wherein said means for storing said run length and associated color components in said memory means comprises means for alternately storing said run length and color components data in a first pingpong buffer memory until a first set of said data is complete, and sequentially storing said run length and associated color components data of a next set of picture data to a second pingpong buffer memory until said data for said next set of picture data is complete, and repeating said steps of storing in said first and second buffer memories for subsequent picture data sets.

26. The system of claim 23, further comprising means for sequentially presenting picture frame data to a pixel generator from said first pingpong memory buffer and said second pingpong memory buffer as the picture frame data in each said memory buffer is completed.

27. A monitor for use in a video information communication system utilizing a plurality of digitized signals having a portion representing run lengths and a portion representing color of at least a portion of a plurality of scan lines of a video picture frame, said digitized signals being of a first digital word size, said run length portion of said digitized signal being of a second digital word size, and said color portion of said digitized signal being of a third digital word size, the monitor including means for decompressing color video data comprising:
(a) means for storing said run length portion and said color portion in an array in a memory means of run length data and color component data representing said plurality of pixels in said plurality of scan lines in said video picture frame;
(b) means for converting said color portion of said digitized signal into three digital color component signals of fourth, fifth and sixth digital word sizes, respectively;
(c) means for generating a color video display signal from said run length and associated color components for said scan lines of said picture frame for each pixel of said picture frame, by mapping a starting pixel for a run length according to the associated color component, and mapping the remaining pixels in said run length by interpolating a smooth color transition to an ending pixel of said run length, for each said can line to be mapped.

28. The monitor of claim 27, wherein said fourth, fifth, and sixth digital word sizes are equal.

29. The monitor of claim 27, wherein at least two of said fourth, fifth, and sixth digital word sizes are equal.

30. The monitor of claim 27 wherein each of said fourth, fifth and sixth digital word sizes are different.

31. The monitor of claim 27, wherein said three digital color component signals represent red, green, and blue color video components of an RGB video signal.

32. The monitor of claim 27, wherein said digital color component signals represent cyan, magenta, and yellow color video components.

33. The monitor of claim 27, wherein said three digital color components signals represent first and second colors and a parameter selected from the group consisting of hue, saturation, and intensity based upon luminance of a source video signal.

34. The monitor of claim 27, wherein said three digital color components are based upon hue, saturation and intensity.

35. The monitor of claim 27, wherein the digital word size of each of said digital color components is six bits.

36. The monitor of claim 27, further including means for dividing said run length and color component combinations into a plurality of unconcatenated run length and digital color component combinations having a run length portion of a seventh digital word size smaller than said second digital word size, for each run length and color component combination having a run length value greater than said seventh digital word size.

37. The monitor of claim 27, further including means for receiving skip codes representing run length and color component data in the scan lines to be skipped over in the storing of said run length and associated color components of said scan lines of said picture frame in said memory means, whereby only said run length color component information which has changed in said picture frame is stored in said memory means.

38. The monitor of claim 27, wherein said means for storing said run length and associate color components said memory means comprises means for alternately storing said run length and color components data in a first buffer memory until said data for said picture frame is complete, and sequentially storing said run length and associated color components of a next set of picture data to a second buffer memory until said data for said next set of picture data is complete, and repeating said steps of storing in a first and second buffer memories for subsequent picture data sets.

39. The monitor of claim 36, further comprising means for sequentially presenting picture frame data to a pixel generator from said first memory buffer and said second memory buffer as the picture frame data in each said memory buffer is completed.

40. A system for compressing and decompressing color video data in a video communication information system having means for producing a color video signal for a plurality of video picture frames, with each picture frame comprising a plurality of pixels, and each scan line having a starting pixel and an ending pixel, with each pixel in said frame comprising three digital color component signals, including means for determining a luminance function for each pixel based upon at least one of said three digital color component signals, means for determining run lengths of pixels having said three digital color components, and means for coding combinations of run lengths and color component signals, said decompressing of color video transition data utilizing a plurality of digitized signals having a portion representing run length and a portion representing color of at least a portion of a plurality of scan lines of said video picture frame, said digitized signals being of a first digital word size, said run length portion of said digitized signal of being of a second digital word size and said color portion of said digitized signal being of a third digital word size, and said system for compressing and decompressing color video transition data comprising:
  (a) means for storing said run length portion and said color portion in an array in a memory means of run length data and color component data representing said plurality of pixels in said plurality of scan lines in said video picture frames;
  (b) means for converting said color portion of said digitized signal into three digital color component signals of fourth, fifth and sixth digital word sizes, respectively; and
  (c) means for generating a color video display signal from said run length and associated color components for the scan lines of said picture frame for each pixel of said picture frame, by mapping a starting pixel for run length according to the associated color component, and mapping the remaining pixels in said run length by interpolating a smooth color transition to an ending pixel of said run length, for each scan line to be mapped.

41. The system of claim 40, wherein said fourth, fifth, and sixth digital word sizes are equal.

42. The system of claim 40, wherein at least two of said fourth, fifth, and sixth digital word sizes are equal.

43. The system of claim 40, wherein each of said fourth, fifth, and sixth digital word sizes are different.

44. The system of claim 40, wherein said three digital color component signals represent red, green, and blue color video components of an RGB video signal.

45. The system of claim 40, wherein said digital color component signals represent cyan, magenta, and yellow color video components.

46. The system of claim 40, wherein said three digital color components signals represent first and second colors and a parameter selected from the group consisting of hue, saturation, and intensity, based upon luminance of a source video signal.

47. The system of claim 40, wherein said three digital color components are based upon hue, saturation, and intensity.

48. The system of claim 40, wherein the digital word size of each of said digital color components is six bits.

49. The system of claim 40, further including means for dividing said run length and color component combinations into a plurality of unconcatenated run length and digital color component combinations having a run length portion of a seventh digital word size smaller than said second digital word size, for each run length and color component combination having a run length value greater than said seventh digital word size.

50. The system of claim 40, further including means for receiving skip codes representing run length and color component data in the scan lines to be skipped over in the storing of said run length and associated color components of said scan lines of said picture frame in said memory means, whereby only said run length color component information which has changed in said picture frame is stored in said memory means.

51. The system of claim 40, wherein means for storing said run length and associated color components in said memory means comprises means for alternately storing said run length and color components to a first buffer memory until a first set of said data is complete, and sequentially storing said run length and associated color components data of a next set of picture data to a second buffer memory until said data for said next set of picture data is complete and repeating said steps of storing in said first and second buffer memories for subsequent picture frames.

52. The system of claim 49, further comprising means for sequentially presenting picture frame data to a pixel generator from said first memory buffer and said second memory buffer as the picture frame data in each said memory buffer is completed.

53. A monitor for use in a video information communications system having means for producing a color video signal for a plurality of video picture frames, with each picture frame comprising a plurality of scan lines composed of a plurality of pixels, each scan line having a starting pixel and ending pixel, with each pixel in said frame comprising three digital color component signals;

including means for determining a luminance function for each pixel based upon at least one of said three digital color component signals; means for determining run lengths of color component combinations of pixels in scan lines; and means for coding said combination of run lengths and color components; said monitor utilizing a plurality of digitized signals having a portion representing run length and a portion representing color of at least a portion of plurality scan lines of video picture frame; said digitized signals being of the first digital word size, said run length portion of said digitized signal being of a second digital word size, and said color portion of said digitized signal being of a third word size, and said monitor comprising:

(a) means for storing said run length portion and said color portion in an array in a memory means of run length data and color component data representing said plurality of pixels in said plurality of scan lines in said video picture frames;

(b) means for converting said color portion of said digitized signal into three digital color component signals of fourth, fifth and sixth digital word sizes respectively; and (c) means for generating a color video display signal from said run length and associated color components for the scan lines of said picture frame for each pixel of said picture frame, by mapping a starting pixel for a run length according to the associated color component, and mapping the remaining pixels in said run length by interpolating a smooth color transition to an ending pixel of said run length, for each scan line to be mapped.

54. The monitor of claim 53, wherein said fourth, fifth, and sixth digital word sizes are equal.

55. The monitor of claim 53, wherein at least two of said fourth, fifth, and sixth digital word sizes are equal.

56. The monitor of claim 53, wherein each of said fourth, fifth, and sixth digital word sizes are different.

57. The monitor of claim 53, wherein said digital color component signals represent cyan, magenta, and yellow color video components.

58. The monitor of claim 53, wherein said three digital color components are based upon hue, saturation and intensity.

59. The monitor of claim 53, further including means for dividing said run length and color component combinations into a plurality of unconcatenated run length and digital color component combinations having a run length portion of a seventh digital word size smaller than said second digital word size, for each run length and color component combination having a run length value greater than said seventh digital word size.

60. The monitor of claim 53, further including means for receiving skip codes representing run length and color component data in the scan lines to be skipped over in the storing of said run length and associated color components of said scan lines of said picture frame in said memory means, whereby only said run length color component information which has changed in said picture frame is stored in said memory means.

61. The monitor of claim 53, wherein said means for storing said run length and associate color components in said memory means comprises means for alternately storing said run length and color components data in a first buffer memory until a first set of said data is complete, and sequentially storing said run length and associated color components data of a next set of picture frame data to a second buffer memory until said data for said next set of picture frame data is complete and repeating said steps of storing in a first and second buffer memories for subsequent picture frame data sets.

62. The monitor of claim 61, further comprising means for sequentially presenting picture frame data to a pixel generator in a drawing engine from said first memory buffer and said second memory buffer as each picture frame in each said memory buffer is completed.

63. The monitor of claim 53, wherein said three digital color component signals represent red, green, and blue color video components of an RGB video signal.

64. The monitor of claim 63, wherein said three digital color components signals represent first and second colors and a parameter selected from the group consisting of hue, saturation, and intensity, based upon luminance of a source video signal.

65. The monitor of claim 63, wherein the digital word size of each of said digital color components is six bits.

* * * * *